United States Patent
Kumar et al.

(10) Patent No.: US 10,613,852 B2
(45) Date of Patent: *Apr. 7, 2020

(54) COGNITIVE INSTALLATION OF SOFTWARE UPDATES BASED ON USER CONTEXT

(71) Applicant: International Business Machines Corporation, Armonk, NY (US)

(72) Inventors: Kapish Kumar, Bangalore (IN); Gaurav Mehrotra, Pune (IN); Rulesh Rebello, Maharashtra (IN); Praveen R. Sogalad, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,561

(22) Filed: Apr. 2, 2019

(65) Prior Publication Data

US 2019/0227787 A1 Jul. 25, 2019

Related U.S. Application Data

(63) Continuation of application No. 15/815,824, filed on Nov. 17, 2017, now Pat. No. 10,372,438.

(51) Int. Cl.
*G06F 9/44* (2018.01)
*G06F 8/65* (2018.01)
(Continued)

(52) U.S. Cl.
CPC .......... *G06F 8/65* (2013.01); *G06F 8/71* (2013.01); *G06F 11/34* (2013.01); *G06N 20/00* (2019.01)

(58) Field of Classification Search
None
See application file for complete search history.

(56) References Cited

U.S. PATENT DOCUMENTS 8,166,348 B1 * 4/2012 Kulkarni ............. G06F 11/0793 717/124
8,176,483 B2 5/2012 Hoefler et al.
(Continued)

FOREIGN PATENT DOCUMENTS

CN 104820591 A 8/2015

OTHER PUBLICATIONS

"Method for alerting for problems in combining software components in containers by analysing installation history and deployment lineage by using analytics systems", IP.com Disclosure No. IPCOM000248593D, Dec. 20, 2016, 4 pages.
(Continued)

*Primary Examiner* — Qamrun Nahar
(74) *Attorney, Agent, or Firm* — Reza Sarbakhsh; Edell, Shapiro & Finnan, LLC

(57) ABSTRACT

A system receives one or more messages including information related to one or more issues associated with a software application installed on a user device. In response to receiving the message, a processor in the system identifies a user context associated with the user device, wherein the user context comprises usage information related to the software application. The processor further analyzes the received information and the user context associated with the user device to determine one or more errors associated with the software application. One or more software updates that are available and associated with the one or more errors are determined. The system automatically installs one or more of the determined software updates on the user device. Embodiments of the present invention further include a method and computer program product for managing and installing one or more software updates in substantially the same manner as is described above.

20 Claims, 5 Drawing Sheets

(51) Int. Cl.
    *G06F 11/34*    (2006.01)
    *G06F 8/71*     (2018.01)
    *G06N 20/00*    (2019.01)

(56) References Cited

U.S. PATENT DOCUMENTS

| | | |
|---|---|---|
| 8,365,191 B2 | 1/2013 | Gruenewald et al. |
| 9,442,832 B2 | 9/2016 | Bharara |
| 2007/0157192 A1 | 7/2007 | Hoefler et al. |
| 2008/0301667 A1* | 12/2008 | Rao .................... G06F 8/65 717/172 |
| 2014/0282476 A1 | 9/2014 | Ciudad et al. |
| 2014/0373001 A1 | 12/2014 | Wang |
| 2015/0363196 A1 | 12/2015 | Carback, III et al. |
| 2016/0292065 A1 | 10/2016 | Thangamani et al. |
| 2016/0378636 A1 | 12/2016 | Strong et al. |
| 2018/0373580 A1 | 12/2018 | Ertl et al. |

OTHER PUBLICATIONS

Monperrus, "Automatic Software Repair: a Bibliography", ACM Computing Surveys, Jun. 2017, 26 pages.
Long et al., "Automatic Patch Generation by Learning Correct Code", POPL '16, St. Petersburg, FL, Jan. 2016, pp. 298-312.
List of IBM Patents or Patent Applications Treated as Related, filed Apr. 2, 2019.

\* cited by examiner

COGNITIVE INSTALLATION OF SOFTWARE UPDATES BASED ON USER CONTEXT

BACKGROUND

1. Technical Field

Present invention embodiments relate to cognitively managing and installing software updates based on user context, and more specifically, to using machine learning methods and/or techniques to automatically detect relevant software defects based on usage information and installation parameters associated with a database software system to identify and install software updates.

2. Discussion of the Related Art

All software is prone to defects and bugs, which may escape routine detection and manifest in a client environment. Some of these defects may be recurring while others may surface only when favorable conditions exist in the client environment. In response, enterprise users frequently receive messages related to various software updates or patches that are available to correct known bugs or security vulnerabilities in vendor-deployed software applications. Enterprise users, however, may be uncertain as to whether a recent update will correct an issue actually occurring within their system environment or whether the update will expose their environment to unnecessary risks, making the environment more vulnerable to future threats. Users may therefore be reluctant to install recently-released software updates or may stop using critical product functionalities, potentially leading to business disruption and loss of revenue. Accordingly, if a software issue occurs on a user device relatively infrequently, a user may elect to sustain the issue rather than risk the integrity of the device. Furthermore, given the large number of user contexts and environments associated with any software deployment, vendors are unlikely to deploy patches that are customized to individual user contexts and vulnerabilities. Consequently, many software vulnerabilities may not be adequately corrected.

SUMMARY

According to an embodiment of the present invention, a system manages and installs one or more software updates. Initially, a system receives one or more messages including information related to one or more issues associated with a software application installed on a user device. In response to receiving the message, a processor in the system identifies a user context associated with the user device, wherein the user context comprises usage information related to the software application. The processor further analyzes the received information and the user context associated with the user device to determine one or more errors associated with the software application. One or more software updates that are available and associated with the one or more errors are determined. The system automatically installs one or more of the determined software updates on the user device. Embodiments of the present invention further include a method and computer program product for managing and installing one or more software updates in substantially the same manner as is described above.

DETAILED DESCRIPTION

Present invention embodiments manage and install software updates based on user context information. Initially, a server analyzes user context information associated with one or more user devices, including, but not limited to, previous software installations (e.g., software packages, version numbers, release data, etc.), usage information (e.g., application preferences, installed features, usage rate, etc.), and user-defined parameters (e.g., security preferences, environmental information, etc.). A processor in the server uses cognitive analytic techniques to determine vulnerability information associated with the one or more user devices based on the user context information. After determining the vulnerability information, the processor retrieves published software update information from a plurality of sources, including, but not limited to, vendor servers, third-party sources, and internal databases, and analyzes the software update information to generate a list of recommended software updates based on the user context information and vulnerability information. A recommended software update may be installed to address the vulnerabilities. Embodiments of the present invention further include a method and computer program product for cognitively managing and installing software updates based on user context information, in substantially the same manner as described above.

Present invention embodiments cognitively derive a list of defects which potentially can impact a customer environment based on the product features used, the workload pattern, changing product usage, added user base, and complexity of operations. Present invention embodiments further identify the pattern, using machine learning, for all product features which are used and active in a customer environment.

Based on the above list of defects and identified patterns, present invention embodiments determine a customized package which can be applied to a customer environment to proactively prevent risk. Further, based on the error reporting in the products, present invention embodiments suggest selective fixes using cognitive and machine learning approaches. A user may select only those defects and dependent defects which are encountered in their environment, and create a customized package online that may be applied to fix the identified defects (instead of applying the entire patch which contains fixes for all defects in general by the product company). In addition, present invention embodiments may identify a vulnerability assessment and security patches required for the product based on the prescribed customer security policy.

Figure 1:
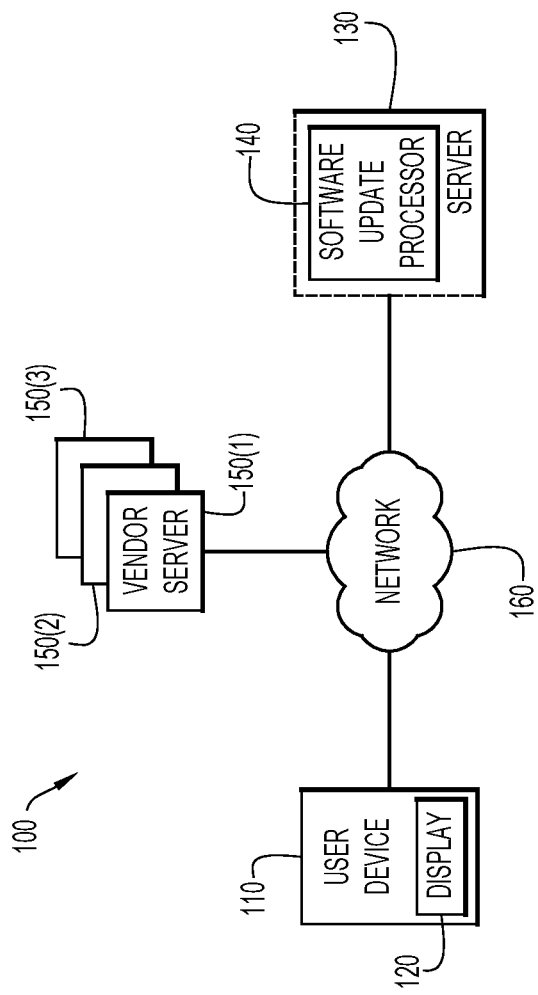
FIG. 1 is a diagrammatic illustration of an example computing environment for use with an embodiment of the present invention.

An example computing environment for use with present invention embodiments is illustrated in FIG. 1. Specifically, environment 100 includes a user device 110, one or more servers 130, and one or more vendor servers 150. Server 130 may comprise one or more software update processors 140, which are responsible for recommending one or more software updates and/or patches based on user context information, published software updates, and previously installed software associated with user device 110. Server 130 and user device 110 may be remote from each other and communicate over a network 160. Network 160 may be implemented by any number of any suitable communications media (e.g., wide area network (WAN), local area network (LAN), Internet, Intranet, etc.). Alternatively, server 130 and user device 110 may be local to each other, and communicate via any appropriate local communication medium (e.g., local area network (LAN), hardwire, wireless link, Intranet, etc.).

User device 110 enables users to receive one or more recommendations for software updates and/or patches based on user context information analyzed at server 130. For example, user device 110 may receive recommendation for one or more software updates and/or patches based on vulnerabilities associated with user device 110. According to a present invention embodiment, server 130 may automatically install one or more software updates and/or patches on user device 110 when server 130 determines that the one or more software updates should be installed based on user context information and vulnerability information associated with user device 110.

Initially, server 130 receives a request from a user associated with user device 110 to determine whether one or more software updates and/or patches should be installed on user device 110. After receiving the request from user device 110, server 130 analyzes user context information associated with user device 110 and requests software update information from one or more vendor servers 150. Server 130 may further evaluate the received software update information and/or software update information associated with previously installed software and/or patches to generate a recommendation for one or more software updates and forward the recommendation to user device 110 to present on display 120 to the user.

According to a present embodiment, server 130 may periodically send one or more requests to one or more vendor servers 150 for software update information related to software applications and/or patches previously installed on one or more user devices 110. Server 130 may store the software update information and, may, using machine learning techniques, analyze user context information associated with one or more user devices to determine whether one or more software updates and/or patches should be installed on the one or more user devices 110. According to a present embodiment, server 130 may automatically install one or more software updates and/or patches on one or more user devices 110 based on user context information associated with the one or more user devices 110.

Figure 2:
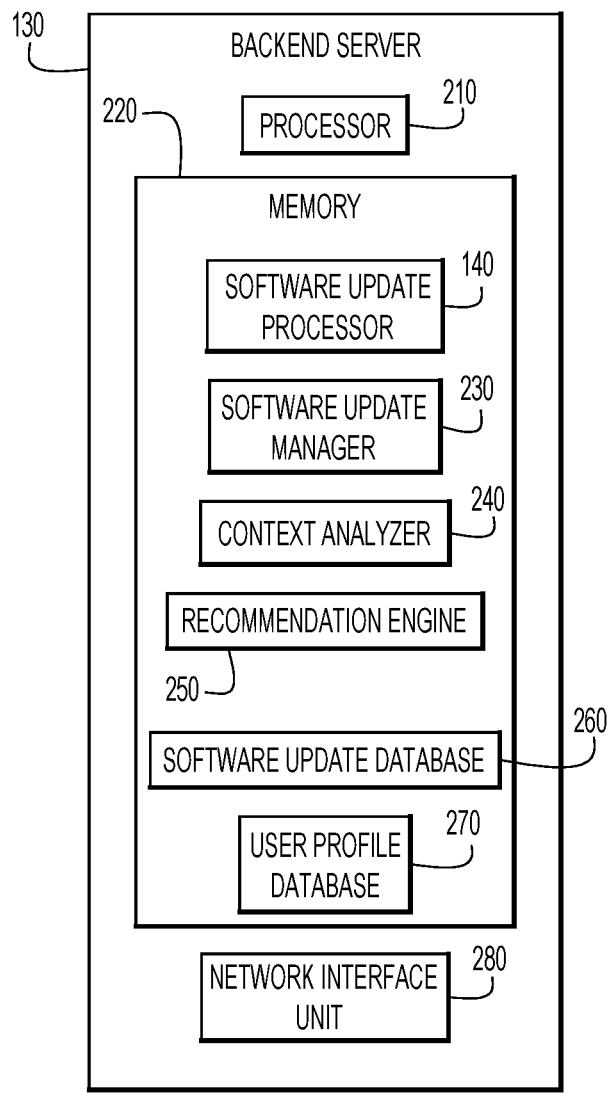
FIG. 2 is a block diagram illustrating the server of FIG. 1 in more detail according to an embodiment of the present invention.

Reference is now made to FIG. 2, which shows an example block diagram of server 130 configured to perform software update recommendations and installations according to present invention embodiments. It should be understood that there are numerous possible configurations for server 130 and FIG. 2 is meant to be an example of one of the possible configurations. Server 130 includes a processor 210, memory 220 and a network interface unit 280. The network interface (I/F) unit (NIU) 280 is, for example, an Ethernet card or other interface device that allows the server 130 to communicate over communication network 160. Network I/F unit 280 may include wired and/or wireless connection capabilities.

Processor 210 may include a collection of microcontrollers and/or microprocessors, for example, each configured to execute respective software instructions stored in the memory 220. Portions of memory 220 (and the instruction therein) may be integrated with processor 210.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 220 may comprise one or more computer readable storage media (e.g., a memory device) encoded with software comprising computer executable instructions and when the software is executed (e.g., by processor 210) it is operable to perform the operations described herein. For example, memory 220 stores or is encoded with instructions or modules for software update processor 140, which is configured to analyze user context information to determine whether one or more software updates and/or patches should be installed on user device 110. Optionally, user device 110 and/or server 130 may, individually or in combination, include software update processor 140 to perform the user context analysis to determine whether one or more software updates and/or patches should be installed on user device 110.

Memory 220 may further store or is encoded with instructions for software update manager 230 to perform overall control of the software update managing operations described herein by receiving one or more inputs from multiple components, including context analyzer 240, recommendation engine 250, software update database 260 and user profile database 270. Software update manager 240 is further configured to send one or more requests to user device 110 for user profile information, including one or more characteristics and/or security preferences associated with a user of user device 110 and one or more system parameters associated with user device 110. Software update manager 230 is further configured to store the received user profile information in user profile database 270 for further software update recommendation operations.

Context analyzer 240 may use machine learning techniques to cognitively analyze user context information associated with user device 110, including, but not limited to, software installation configuration information (e.g., application, version numbers, release information, configuration parameters, etc.), user preference information (e.g., user characteristics, security preferences, etc.) and/or user device information (e.g., manufacturer, device configuration information, etc.) to determine a user context associated with one or more software applications installed on user device 110.

Recommendation engine 250 determines whether one or more software updates and/or patches should be installed on user device 110 based on user context information and software update information, as well as pre-configured characteristics or preferences associated with a user associated with user device 110. If it is determined that one or more software updates and/or patches should be installed, recommendation engine 250 is further configured to generate a recommendation message including the one or more software updates and/or patches that should be installed and forward the recommendation message to user device 110 for display to a user associated with user device 110.

Software update manager 230, context analyzer 240, and recommendation engine 270 may include one or more modules or units to perform the various functions of present invention embodiments described below. The various modules (e.g., software update manager, context analyzer, recommendation engine, etc.) may be implemented by any combination of any quantity of software and/or hardware modules or units, and may reside within memory 220 of server 130 for execution by processor 210.

Memory 220 may further provide software update database 260, which stores various information used and received by software update manager 230 for analysis of software installation information associated user device 110. For example, software update database 260 may store information related to one or more previous software installations and/or updates (e.g., application, version, release information, configuration parameters, etc.), as well as software update information received from one or more vendor servers 150 associated with the one or more previous installations and/or updates.

Memory 220 may further provide user profile database 270, which stores various information used and received by software update manager 230 for analysis of user context information associated with a user of user device 110. For example, user profile database 270 may store one or more characteristics or preferences associated with a user (e.g., security preferences, user characteristic information, etc.), and/or one or more environmental parameters associated with user device 110 (e.g., public environment, public network, etc.).

Software update database 260 and user profile database 270 may be implemented by any conventional or other database or storage unit, may be local to or remote from server 130, and may communicate via any appropriate communication medium (e.g., local area network (LAN), wide area network (WAN), Internet, hardwire, wireless link, Intranet, etc.).

Server 130 may be implemented by any conventional or other computer systems preferably equipped with a display or monitor, a base (e.g., including at least one processor 210, one or more memories 220 and/or internal or external network interfaces or communications devices 280 (e.g., modem, network cards, etc.), optional input devices (e.g., a keyboard, mouse or other input device), and any commercially available and custom software (e.g., server/communications software, etc.).

Figure 3:
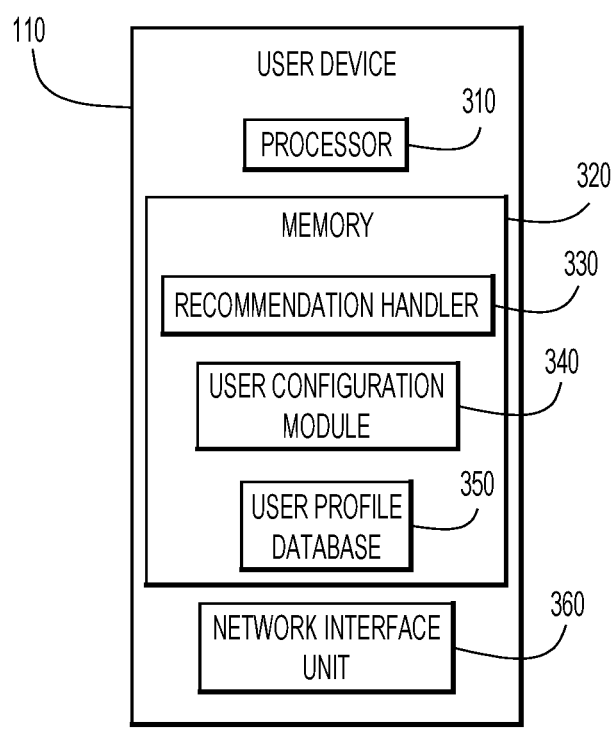
FIG. 3 is a block diagram illustrating the user device of FIG. 1 in more detail according to an embodiment of the present invention.

Reference is now made to FIG. 3, which shows an example block diagram of a user device 110 configured to receive and display recommendation messages according to present invention embodiments. It should be understood that there are numerous possible configurations for user device 110 and FIG. 3 is meant to be an example of one of the possible configurations. User device 110 includes a processor 310, memory 320 and a network interface unit 360. The network interface (I/F) unit (NIU) 360 is, for example, an Ethernet card or other interface device that allows user device 110 to communicate over communication network 160. Network I/F unit 360 may include wired and/or wireless connection capabilities.

Processor 310 may include a collection of microcontrollers and/or microprocessors, for example, each configured to execute respective software instructions stored in the memory 320. Memory 320 may include various modules for execution by processor 310, including recommendation handler 330, user configuration module 340, and user profile database 350. Portions of memory 320 (and the instructions or modules therein) may be integrated with processor 310.

Memory 320 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 320 may comprise one or more computer readable storage media (e.g., a memory device) encoded with software comprising computer executable instructions and when the software is executed (e.g., by processor 310) it is operable to perform the operations described herein. For example, memory 320 stores or is encoded with instructions for recommendation handler 330 to perform overall control of the receiving and displaying operations of recommendation messages described herein by receiving one or more inputs from multiple components, including user configuration module 340, and user profile database 350. Recommendation handler 330 is further configured to send one or more user configuration parameters and/or preferences and one or more system parameters to software update processor 140 to determine, based on the received parameters and/or preferences, whether to install one or more software updates and/or patches on user device 110.

User configuration module 340 is configured to allow a user to set one or more security parameters and/or user preferences associated with the user and related to the installation of software applications on user device 110. Accordingly, user configuration module 340 allows a user to set a user security preference at various levels, e.g., (low, medium, high, blocked), such that software applications are installed in accordance with the user's security preference. It should be understood that user configuration module 340 may use any input device and/or graphical user interface (GUI) to receive one or more security parameters and/or user preferences from a user associated with user device 110. For example, user configuration module 340 may display a slider-based GUI to a user associated with user device 110, allowing the user to vary one or more security parameters and/or user preferences based on the position of an arrow, cursor or other indicator within a corresponding slider-based GUI.

Recommendation handler 330 and user configuration module 340 may include one or more modules or units to perform the various functions of present invention embodiments described below. The various modules (e.g., recommendation handler, user configuration module, etc.) may be implemented by any combination of any quantity of software and/or hardware modules or units, and may reside within memory 320 of user device 110 for execution by processor 310.

Memory 320 may further provide user profile database 350, which stores various information used and generated by recommendation handler 330 for displaying one or more update recommendations received from server 130 on user device 110. For example, user profile database 350 may store one or more characteristics or preferences associated with a user (e.g., security preferences, personal sensitivity, etc.), and/or one or more system parameters associated with device 110 (e.g., manufacturer, network environment, etc.). User profile database 350 may be implemented by any conventional or other database or storage unit, may be local to or remote from server 130, and may communicate via any appropriate communication medium (e.g., local area network (LAN), wide area network (WAN), Internet, hardwire, wireless link, Intranet, etc.).

User device 110 may be implemented by any conventional or other computer systems preferably equipped with a display or monitor, a base (e.g., including at least one processor 310, one or more memories 320 and/or internal or external network interfaces or communications devices 360

(e.g., modem, network cards, etc.), optional input devices (e.g., a keyboard, mouse or other input device), and any commercially available and custom software (e.g., communications software, etc.).

Figure 4:
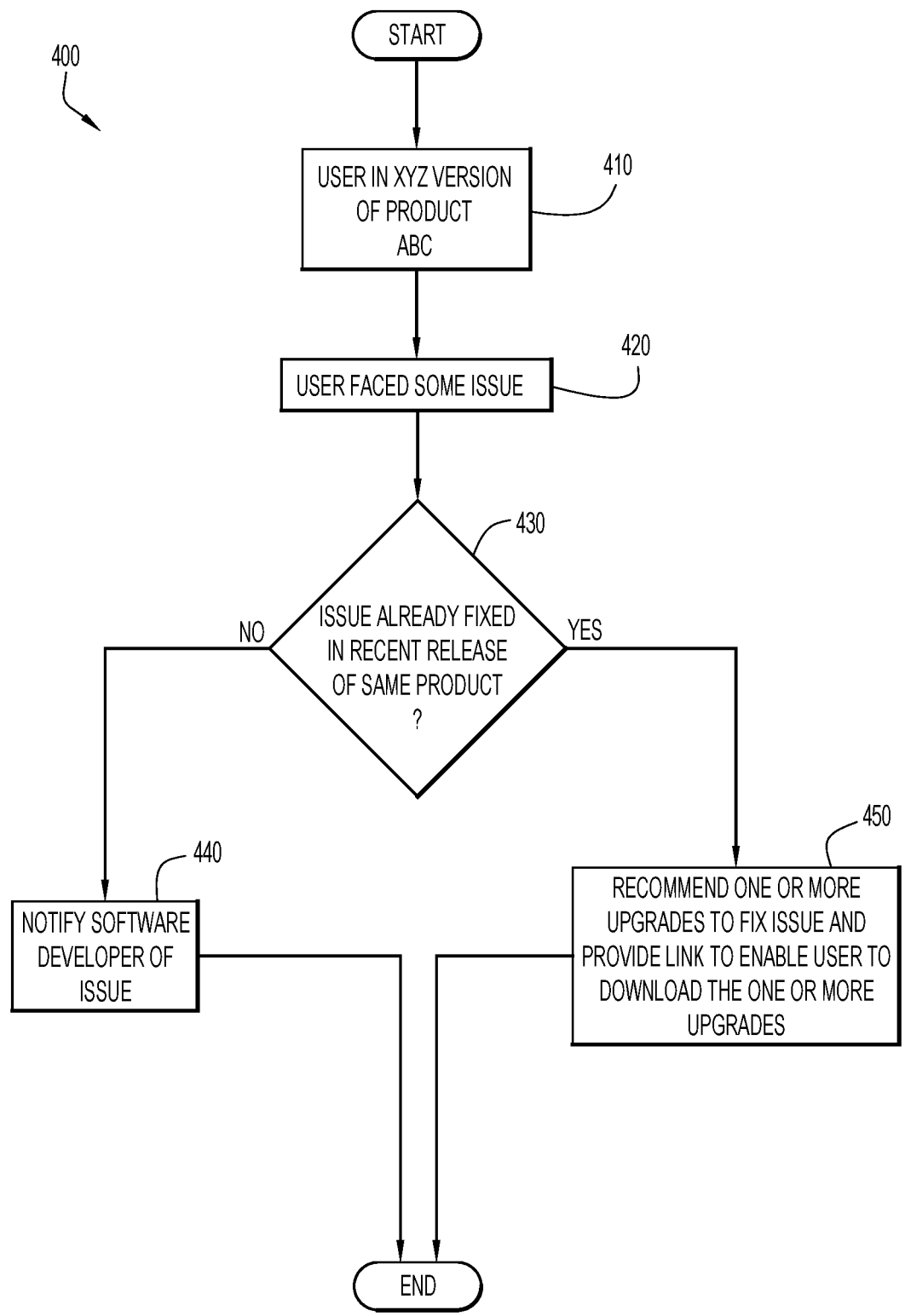
FIG. 4 is a flow chart illustrating a manner in which a software update is dynamically recommended based on user context according to an embodiment of the present invention.

With reference to FIG. 4, there is depicted a procedural flow chart illustrating a method 400 in which a recommendation message is generated based on user context and software update information, and is directed to a user of user device 110. Method 400 is performed primarily by software update manager 230.

Initially, a user is using a version (e.g., XYZ) of a software application (e.g., ABC) on user device 110 at step 410.

The user encounters an issue (e.g., a bug, a warning, an exception, etc.) associated with the software application (e.g., ABC) at step 420. The user may check the system for suggestions based on machine learning and the issue potentially being previously fixed as described below for FIG. 5. For example, the user may send issue details, and the system queries a database which contains all the defect information (e.g., which defect has been fixed and delivered in different releases of products). Matching records are returned with details including resolution, fixed versions, any available workarounds, etc. The system provides this information to the user along with a recommended download link for the fixed release of products. The user or system may take appropriate action as described below.

Server 130 determines whether the issue has been successfully resolved and/or fixed by a previously installed software release and/or update at step 430. If the issue has been successfully resolved and/or fixed by a previously installed software release and/or update, server 130 recommends one or more upgrades to fix the issue and provides links to enable downloading (manually or automatically) and installation of the one or more upgrades at step 450.

If the issue has not been successfully resolved and/or fixed by a previously installed software release and/or update, server 130 notifies the developer and/or distributor of the software application (e.g., ABC) of the issue at step 440, and method 400 ends.

Figure 5:
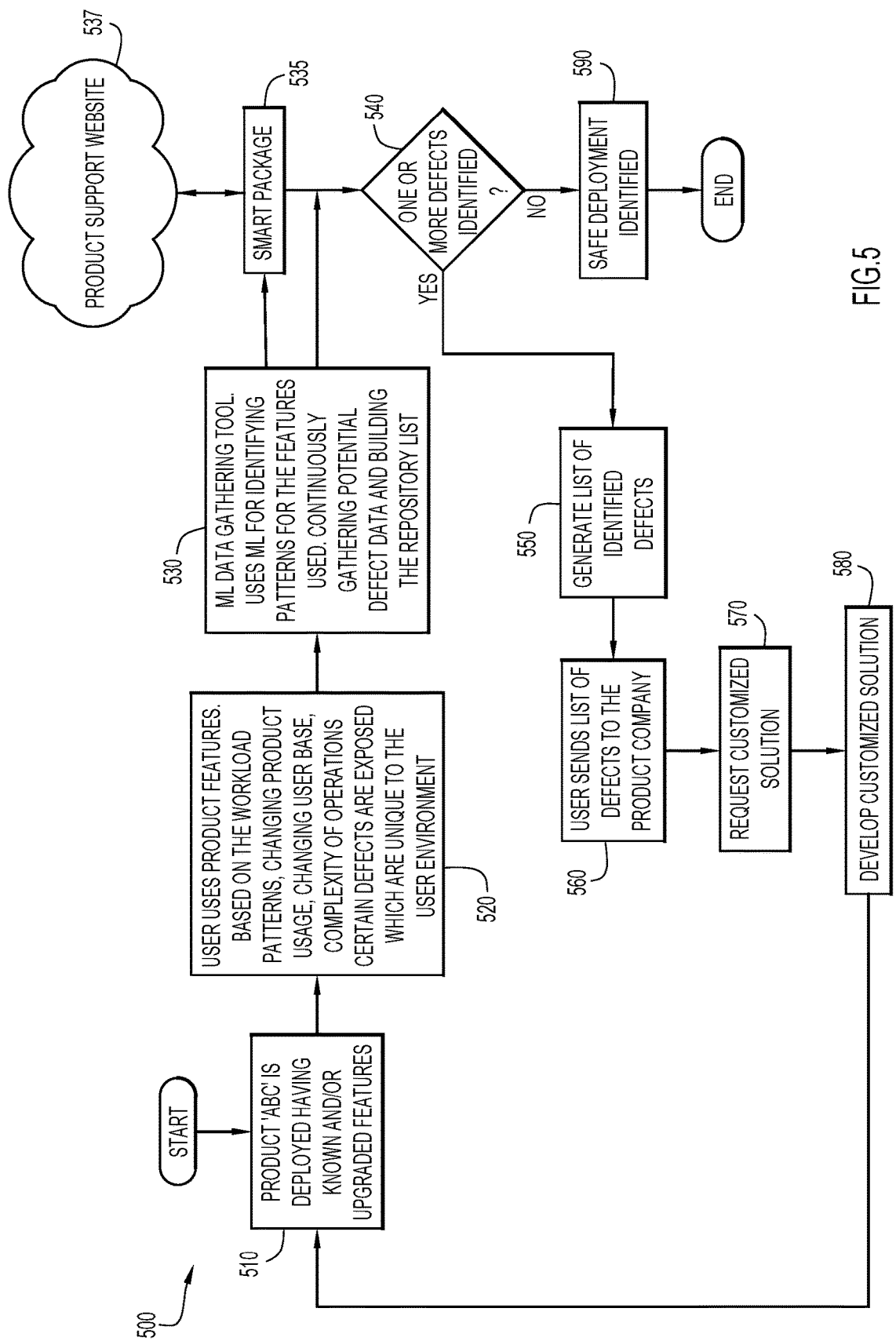
FIG. 5 is a flow chart illustrating a manner in which machine learning is used to identify a list of defects associated with a user environment and to generate a customized solution to correct the defects associated with the user environment according to an embodiment of the present invention.

With reference to FIG. 5, there is depicted a procedural flow chart illustrating a method 500 in which machine learning is used to identify a list of one or more defects associated with a user environment and to generate a customized solution to correct the one or more defects associated with the user environment.

Initially, a user installs a vendor-developed software application (e.g., ABC) on user device 110 that includes one or more features and/or software upgrades at step 510.

The user identifies one or more defects in the software application (e.g., ABC) that result from the unique workload patterns, changing product usage, changing user base, and complexity of operations associated with the user environment at step 520.

User device 110 continuously collects data associated with the one or more defects in the software application (e.g., ABC) and forwards the collected data to server 130, which uses a machine learning tool employing machine learning methods and/or techniques to analyze the data and to generate a database storing information associated with the one or more known defects at step 530. Various machine learning models may be employed to associate the unique features of the user environment to software defects, including neural networks, mathematical/statistical modelling, classifiers, etc. The machine learning models may be initially trained based on known conditions arising from software defects, and dynamically modified (or learn) based on new data (e.g., conditions, defects, etc.) being received and/or encountered.

Server 130 determines whether one or more defects have been identified in the software application (e.g., ABC) at step 540.

If one or more defects have been identified in the software application (e.g., ABC), a list of the identified defects may be generated at step 550, and sent to one or more vendors associated with the software application (e.g., ABC) at step 560.

A user associated with user device 110 may send a request for a customized solution to the one or more vendors at step 570.

In response to receiving the request from the user, the one or more vendors may develop a customized solution including one or more software upgrades and/or patches that may be manually or automatically deployed on the user environment at step 580.

Alternatively, a small smart package may be developed, including defect numbers which are fixed in the latest releases of products, and smart logic to interact with server 130 and the smart package may publish the defect numbers to the client base and/or to a product support website 537. User device 110 may download this smart package at step 535 and run the smart logic against the information in server 130 to make an assessment and impact analysis for defects which may be currently encountered, or encountered in the future, based on the current working logic and patterns of user environments. If the server 130 is employed as part of a hybrid cloud, a service may automatically connect and access the smart package for this the impact analysis.

The machine learning tool of server 130 maintains metadata of current feature usage and workload of the software product. When the smart package is released by a product development team, the smart package uses an API to access the metadata and generate a report with a customized list of open defects which the user environment is currently encountering or is prone to encounter in the near future.

The result of the impact analysis provides a set of defects which are prone in the user environment. A user has an option to submit this list to the product company's site 537 to request a customized fix. This generates a customized package for manual or automatic installation (e.g., similar to steps 560, 570, and 580 described above) without compromising dependency and maintaining version control.

If one or more defects have not been identified in the software application (e.g., ABC), server 130 determines that the user environment has safely deployed software application (e.g., ABC) at step 590, and method 500 ends.

Advantages of the present embodiments described above include machine learning to evaluate one or more RDBMS (Relational Data Base Management System) products deployed in an enterprise environment to identify one or more defects associated with the one or more RDBMS products and to complete a vulnerability assessment (VA) of the enterprise environment. Further advantages of present invention embodiments include remotely monitoring user context and usage characteristics associated with software deployment in a user environment to ensure that known defects (i.e., bugs) in the deployed software are corrected, minimizing the negative impact on the user environment. Another advantage includes using cognitive and machine learning techniques to analyze one or more user error/defect reports to identify a customized solution that may be applied to a user environment, proactively minimizing the risk and costs associated with the known software defects. Another advantage includes identifying known vulnerabilities in a user-deployed environment to allow a user to selectively implement solutions and/or patches that upgrade only those software applications that the user wants to correct.

Present invention embodiments provide a personalized approach to software upgrades taking into account dependencies. Current approaches are manual, time-consuming processes. Present invention embodiments provide an automatic process preventing occurrence of the same defect after following the automatic recommendation and/or upgrade/workaround. Thus, regression is substantially reduced.

Further, since only a subset of the published fixed defects are utilized, quality assurance (QA), user acceptance testing (UAT), and capital and operating expenses are reduced. Moreover, rollback of the software upgrades, if needed, would be quick and fast. In addition, present invention embodiments provide better knowledge with respect to: recommended software compatibility and dependency with other software; a particular feature being enabled/disabled/enhanced in the recommended software levels; bugs which are already fixed, but the fix is revoked for some reason in the next version of software so that appropriate action may be taken; new features/enhancements added so as to enhance their applications or develop new applications to make use of new features from new software; and software going Ethernet over SDH (EoS).

It will be appreciated that the embodiments described above and illustrated in the drawings represent only a few of the many ways of implementing embodiments for automated software update recommendations based on user context.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.).

The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., software update manager, context analyzer, recommendation engine, etc.). These systems may include any types of monitors and input devices (e.g., keyboard, mouse, voice recognition, etc.) to enter and/or view information.

It is to be understood that the software (e.g., software update manager, context analyzer, recommendation engine, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., software update manager, context analyzer, recommendation engine, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store any information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., messages, analytics, configurations, user or other preferences, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion. The report may include any information arranged in any fashion, and may be configurable based on rules or other criteria to provide desired information to a user.

The present invention embodiments are not limited to the specific tasks or algorithms described above, but may be utilized for any type of software update recommendation on any type of user device (e.g., computer, laptop, smartphone, server, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing and installing one or more software updates comprising:
   receiving a message including information related to one or more issues associated with a software application on a user device;
   identifying a user context associated with the user device, wherein the user context comprises usage information related to the software application;
   analyzing the received information and the user context associated with the user device to determine a plurality of errors associated with the software application;
   determining one or more software updates associated with the plurality of errors that are available;
   identifying one or more of the determined software updates that resolve a selected portion of the plurality of errors to produce a customized solution for the user device; and
   installing the identified software updates on the user device to resolve the selected portion of the plurality of errors.

2. The method of claim 1, further comprising:
   generating a list of the plurality of errors and forwarding the plurality of errors to a user;
   receiving a message from the user indicating which of the plurality of errors the user wants to fix; and
   installing one or more software updates based on the message received from the user indicating which of the plurality of errors the user wants to fix.

3. The method of claim 1, wherein the usage information includes product version information associated with the software application.

4. The method of claim 3, wherein the product version information includes release data and a version number associated with the software application.

5. The method of claim 1, wherein the message including information related to one or more issues associated with a software application on a user device is periodically received.

6. The method of claim 1, wherein one or more machine learning techniques are used to analyze the received information and the user context associated with the user device to determine the plurality of errors associated with the software application.

7. The method of claim 1, further comprising storing information associated with the plurality of errors in a relational database.

8. A system for managing and installing one or more software updates comprising:
   at least one processor configured to:
      receive a message including information related to one or more issues associated with a software application on a user device;
      identify a user context associated with the user device, wherein the user context comprises usage information related to the software application;
      analyze the received information and the user context associated with the user device to determine a plurality of errors associated with the software application;
      determine one or more software updates associated with the plurality of errors that are available;
      identify one or more of the determined software updates that resolve a selected portion of the plurality of errors to produce a customized solution for the user device; and
      install the identified software updates on the user device to resolve the selected portion of the plurality of errors.

9. The system of claim 8, wherein the at least one processor is further configured to:
   generate a list of the plurality of errors and forward the plurality of errors to a user;
   receive a message from the user indicating which of the plurality of errors the user wants to fix; and
   install one or more software updates based on the message received from the user indicating which of the plurality of errors the user wants to fix.

10. The system of claim 8, wherein the usage information includes product version information associated with the software application.

11. The system of claim 10, wherein the product version information includes release data and a version number associated with the software application.

12. The system of claim 8, wherein the message including information related to one or more issues associated with a software application on a user device is periodically received.

13. The system of claim 8, wherein one or more machine learning techniques are used to analyze the received information and the user context associated with the user device to determine the plurality of errors associated with the software application.

14. A computer program product for managing and installing one or more software updates, the computer program product comprising a computer readable storage medium having program instructions embodied therewith, the program instructions executable by at least one processor to cause the at least one processor to:

receive a message including information related to one or more issues associated with a software application on a user device;

identify a user context associated with the user device, wherein the user context comprises usage information related to the software application;

analyze the received information and the user context associated with the user device to determine a plurality of errors associated with the software application;

determine one or more software updates associated with the plurality of errors that are available;

identify one or more of the determined software updates that resolve a selected portion of the plurality of errors to produce a customized solution for the user device; and install the identified software updates on the user device to resolve the selected portion of the plurality of errors.

15. The computer program product of claim 14, wherein the program instructions are further configured to cause the at least one processor to:

generate a list of the plurality of errors and forward the plurality of errors to a user;

receive a message from the user indicating which of the plurality of errors the user wants to fix; and install one or more software updates based on the message received from the user indicating which of the plurality of errors the user wants to fix.

16. The computer program product of claim 14, wherein the usage information includes product version information associated with the software application.

17. The computer program product of claim 16, wherein the product version information includes release data and a version number associated with the software application.

18. The computer program product of claim 14, wherein the message including information related to one or more issues associated with a software application on a user device is periodically received.

19. The computer program product of claim 14, wherein one or more machine learning techniques are used to analyze the received information and the user context associated with the user device to determine the plurality of errors associated with the software application.

20. The computer program product of claim 14, wherein the program instructions are further configured to cause the at least one processor to:

store information associated with the plurality of errors in a relational database.

\* \* \* \* \*